(12) United States Patent
Heitel

(10) Patent No.: US 7,163,257 B2
(45) Date of Patent: Jan. 16, 2007

(54) SLIDE OUT AWNING MECHANISM

(75) Inventor: Robert G. Heitel, Laguna Beach, CA (US)

(73) Assignee: Girard Systems, San Clemente, CA (US)

( * ) Notice: Subject to any disclaimer, the term of this patent is extended or adjusted under 35 U.S.C. 154(b) by 55 days.

(21) Appl. No.: 10/973,179

(22) Filed: Oct. 26, 2004

(65) Prior Publication Data

US 2006/0087140 A1    Apr. 27, 2006

(51) Int. Cl.
    *B60P 3/34*    (2006.01)
(52) U.S. Cl. ............ 296/163; 296/165; 296/171; 296/175; 160/66; 135/88.11
(58) Field of Classification Search ............ 296/163, 296/165, 171, 172, 175, 176; 160/66, 23.1; 135/88.01, 88.05, 88.1, 88.11
    See application file for complete search history.

(56) References Cited

U.S. PATENT DOCUMENTS 512,273 A    1/1894    Brown
4,615,371 A    10/1986    Clauss
4,641,805 A    2/1987    Martensson, IV
5,171,056 A    12/1992    Faludy et al.
5,192,111 A *    3/1993    Hanemaayer .............. 135/88.1
5,280,687 A    1/1994    Boiteau
5,752,536 A    5/1998    Becker
5,860,440 A    1/1999    Murray et al.
6,123,136 A    9/2000    Williams
RE37,567 E *    3/2002    Murray ...................... 296/163
6,619,726 B1    9/2003    Jones

* cited by examiner

Primary Examiner—Stephen Gordon
(74) Attorney, Agent, or Firm—Walter A. Hackler

(57) ABSTRACT

An awning mechanism for a recreational vehicle having a slider includes a box awning having a frame and a roller disposed therein with an awning rolled about the roller and extendable therefrom. The awning includes a leading edge and a bracket is provided for mounting the frame to a stationary wall of the recreational vehicle. A header attachable to the slider beneath the frame is provided with the bracket and the header having a generally coplanar relationship with the slide out in a fully retracted position. Linkage is provided which interconnects the header and the leading edge and includes structure enabling shortening of the linkage as the header passes beneath the leading edge on the roller.

12 Claims, 1 Drawing Sheet

SLIDE OUT AWNING MECHANISM

The present invention is generally related to retractable awnings and is more particularly related to retractable awnings for use with recreational vehicles having sliders.

Recreational vehicles may be provided with retractable structure commonly referred to as a slider, or slide out. Such sliders are generally rectangular shaped and moveable between an extended position and a retracted position.

The roof of the slider is typically a flat surface, which substantially parallel to a roof of the recreational vehicle. When in an extended position rain, snow, leaves, dirt, and other debris can collect on the slider top, which is then carried into the interior of the recreational vehicle when a slider is retracted. Seals may be provided to prevent entry of the debris into the interior of the recreational vehicle but such seals have not proven to be effective.

Accordingly, to prevent entry of debris into the recreational vehicle and prevent accumulation of same on the slider top, retractable awnings have been provided over the roof of the slider which covers the slider when the slider is in an extended position.

Thus, any rain, snow, leaves, dirt, and other debris collects on the awning rather than on the roof of the slider. Such accumulation is then dispersed as the awning is retracted onto a roller.

While such slider retractable awnings provide adequate protection of the slider from debris the awning may billow or unfurl due to air currents during transit of the recreational vehicle. To prevent such action, a linkage may be utilized between the slider and the awning fabric.

Unfortunately, as the slider is extended, it passes below a centerline of a roller supporting the retracted awning and some shortening of the "knuckle" distance between the slider and the roller may occur as a lead rail passes beneath the main awning roll.

The present invention provides for an awning mechanism to absorb this shortening of the "knuckle" distance to avoid pinching of extruded aluminum sections.

SUMMARY OF THE INVENTION

An awning mechanism in accordance with the present invention for a recreational vehicle having a slider, or slide out, generally includes a box awning having a frame and a roller disposed therein.

An awning is rolled about the roller and extendable therefrom with the awning having a leading edge.

A bracket is provided for mounting the frame to a stationary wall of the recreational vehicle and an awning header is attached to the slide out beneath the frame with the bracket and the header being generally coplanar with the slider in a fully retracted position.

Linkage interconnecting the header and the leading edge is provided with the linkage having structure for enabling shortening of the linkage as the header passes between the leading edge and the roller.

More particularly, the mechanism includes an articulated linkage and the articulation includes a plurality of segments united by joints.

Still more particularly, each joint includes an open ended link and a corresponding head slidable within the link and the sliding movement enables the linkage shortening.

Each segment includes an arm attached to a corresponding head and pivotable with respect to an adjacent link, the pivoting enabling the header to move transversely under the leading edge and roller.

Still more particularly, the segment is pivotable up to an angle of about 45° from the longitudinal axis of an adjacent link.

The present invention also provides for an improvement for an awning mechanism for a recreational vehicle having a slider, a box awning having a frame and a roller disposed therein. The awning mechanism further includes an awning rolled about the roller and extendable therefrom with the awning having a leading edge. A bracket mounts the frame to a stationary wall of a recreational vehicle, and a header is attached to the slider beneath the frame with the bracket and header being coplanar with the slider in a fully retractable position. The improvement in accordance with the present invention provides for a linkage interconnecting the header and the leading edge with the linkage shortening as the header passes beneath the leading edge and roller.

BRIEF DESCRIPTION OF THE DRAWINGS

The advantages and features of the present invention will be better understood by the following description when considered in conjunction with the accompanying drawings in which.

DETAILED DESCRIPTION

Figure 1:
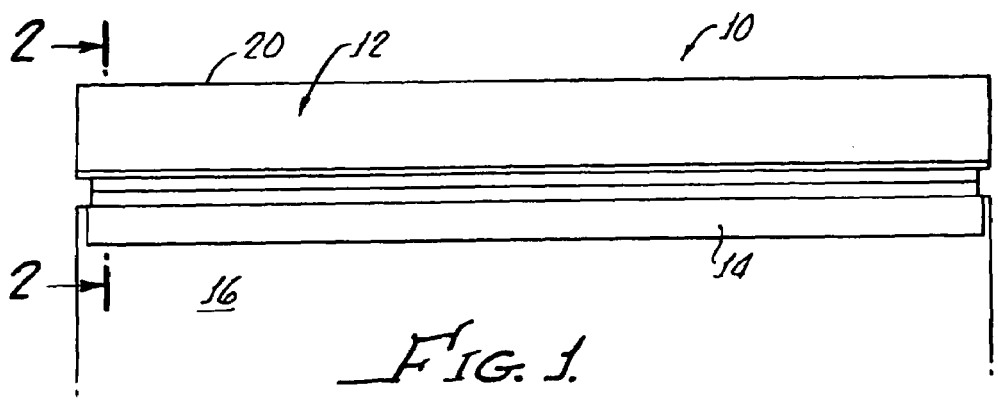
FIG. 1 is a front plan view of a box awning as it may be attached to a recreational vehicle, with a header attached to a slide out, or slider.

With reference to FIG. 1, there is shown an awning mechanism 10 generally including a box awning 12 and a header 14 attached to a recreational vehicle slider 16.

Figure 2:
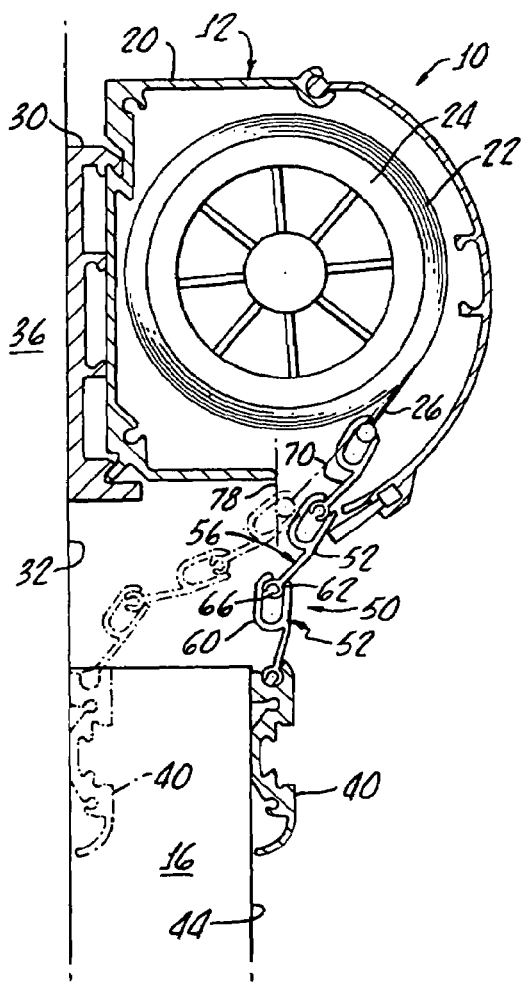
FIG. 2 is a cross sectional view of the awning mechanism shown in FIG. 1 taken along the line 2—2 showing the slider in a fully retracted position in dashed line and, in solid time, in a partially extended position with the header passing beneath the awning leading edge in a roller.
Figure 3:
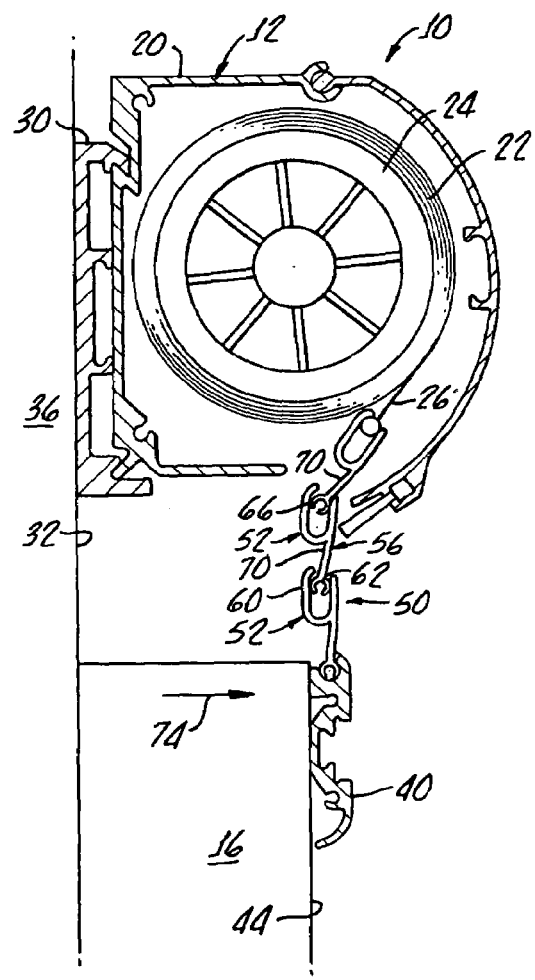
FIG. 3 is a view similar to FIG. 2 showing a position in which the header is directly below a leading edge of the awning and showing a maximum shortening of the linkage.

With further reference to FIGS. 2 and 3, the box awning 12 includes a frame 20 and an awning 22 rolled about a roller 24 and extendable therefrom with the awning 22 including a leading edge 26.

A bracket 30 is provided for mounting the frame 20 to a stationary wall 32 of a recreational vehicle 36.

A header 40 is attached in a conventional manner to an outside surface 44 of the slider 16 and as shown in phantom line in FIG. 2, the bracket 30 and header 40 having a coplanar relationship with the slider 16 in a fully retracted position.

An articulated linkage 50 is provided which includes a plurality of identical segments 52 united by joints 56.

Each segment 50 includes a link 60 with an open end 62 and each joint includes a head 66 slidable within the link 60 with such a sliding and movement enabling linkage 50 shortening as illustrated by comparing FIG. 2 with FIG. 3.

Each of the joints 56 include an arm 70 attached to a corresponding head 66 and pivotal with respect to an adjacent link 60 with such pivoting enabling the header 40 to move transversely, as indicated by the arrow 74 under the leading edge 26 and roller 24.

As illustrated in the figures, the segments 52 are pivotable up to an angle of about 45° from a longitudinal axis 78 of an adjacent link.

Although there has been hereinabove described a specific slide out awning mechanism in accordance with the present invention for the purpose of illustrating the manner in which the invention may be used to advantage, it should be appreciated that the invention is not limited thereto. That is, the present invention may suitably comprise, consist of, or consist essentially of the recited elements. Further, the invention illustratively disclosed herein suitably may be practiced in the absence of any element which is not specifically disclosed herein. Accordingly, any and all modifications, variations or equivalent arrangements which may occur to those skilled in the art, should be considered to be within the scope of the present invention as defined in the appended claims.

What is claimed is:

1. An awning mechanism for a recreational vehicle having a slide out, the mechanism comprising:
    a box awning having a frame and a roller disposed therein;
    an awning rolled about said roller and extendable therefrom, said awning having a leading edge;
    a bracket mounting said frame to a stationary wall of said recreational vehicle;
    a header attachable to said slide out beneath said frame, said bracket and header having a coplanar relationship with the slide out in a fully retracted position; and
    a linkage interconnecting said header and said leading edge, said linkage shortening as said header passes beneath said leading edge and roller.

2. The mechanism according to claim 1 wherein said linkage is articulated.

3. The mechanism according to claim 2 wherein the articulation includes a plurality of segments united by joints.

4. The mechanism according to claim 3 wherein each segment includes an open ended link and each joint includes a corresponding head slidable within the link, the sliding movement enabling the linkage shortening.

5. The mechanism according to claim 4 where each segment includes an arm attached to a corresponding said head and pivotable with respect to an adjacent said link, the pivoting enabling said header to move transversely under said leading edge and roller.

6. The mechanism according to claim 5 wherein each segment is pivotable up to an angle of about 45° from a longitudinal axis of the adjacent link.

7. In an awning mechanism for a recreational vehicle having a slide out, a box awning having a frame and a roller disposed therein, an awning rolled about said roller and extendable therefrom, said awning having a leading edge, a bracket mounting said frame to a stationary wall of said recreational vehicle, a header attachable to said slide out beneath said frame, said bracket and header having coplanar relationship with the slide out in a fully retracted position; the improvement comprising:
    a linkage interconnecting said header and said leading edge, said linkage shortening as said header passes beneath said leading edge and roller.

8. The improvement according to claim 7 wherein said linkage is articulated.

9. The improvement according to claim 8 wherein the articulation includes a plurality of segments united by joints.

10. The improvement according to claim 9 wherein each segment includes an open ended link and each joint includes a corresponding head slidable within the link, the sliding movement enabling the linkage shortening.

11. The improvement according to claim 10 where each segment includes an arm attached to a corresponding said head and pivotable with respect to an adjacent said link, the pivoting enabling said header to move transversely under said leading edge and roller.

12. The improvement according to claim 11 wherein each segment is pivotable up to an angle of about 45° from a longitudinal axis of the adjacent link.

* * * * *